April 26, 1927. 1,626,092
A. MASTER
BALL BEARING MOUNTING
Filed Dec. 13, 1923
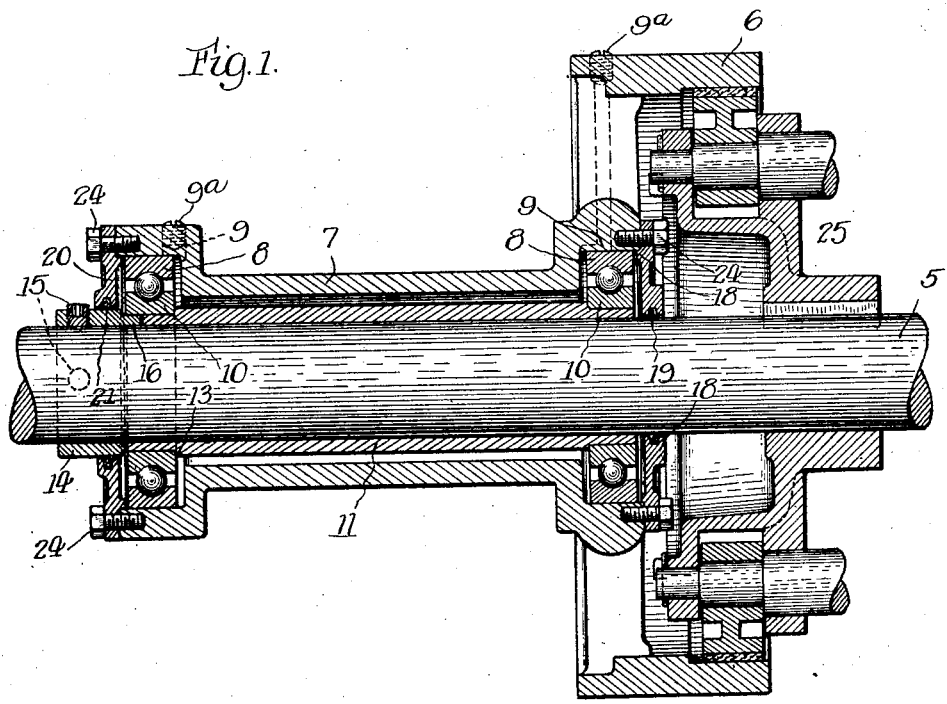
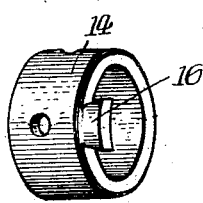
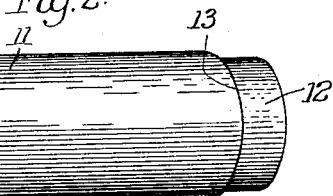
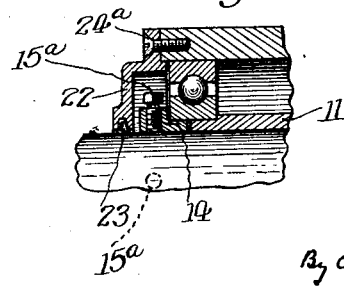
Inventor.
Albert Master,
By Crichdahl Parker Carlson
Attys.

Patented Apr. 26, 1927.

1,626,092

UNITED STATES PATENT OFFICE.

ALBERT MASTER, OF PARK RIDGE, ILLINOIS.

BALL-BEARING MOUNTING.

Application filed December 13, 1923. Serial No. 680,299.

This invention relates to a ball bearing mounting for a clutch with extended sleeve, a clutch pulley, loose pulley, sprocket, gear, sheave, hanger box, or the like.

The object of the invention is to provide simple and effective means for securing the inner ball races against movement longitudinally and circumferentially of the shaft.

In the accompanying drawings, Figure 1 is a longitudinal sectional view of a clutch with extended sleeve having a ball bearing mounting embodying the features of my invention. Figs. 2 and 3 are perspective views of a sleeve and a set collar comprised in said mounting. Fig. 4 represents an alternative construction.

In the drawings, 5 is a shaft and 6 is a clutch friction ring connected by arms or a web to an extended sleeve 7 on which any desired form of split pulley or other member may be mounted. The sleeve 7 may be of any suitable character, that herein shown being of the so-called dumbbell form.

The pulley and the extended sleeve are supported upon the shaft by means of a pair of ball bearings. The outer races 8 of the ball bearings are located within the enlarged ends of the sleeve 7 and may be secured against rotation with relation to the sleeve in any suitable way, as, for example, by means of a close fit of the parts. Adjacent the ball races sufficient space is left leading to an opening 9 in the sleeve for the introduction of a lubricant, a screw 9$^a$ being used to close the opening. The inner ball races 10 are mounted upon the opposite ends of a sleeve 11 adapted to be slipped onto the shaft 5. The ball races 10 may be secured against rotation with reference to the sleeve 11 in any desired manner, as, for example, by pressing said ball races upon the ends of the sleeve, said end portions being slightly reduced in diameter to form seats 12 to receive the ball bearings and shoulders 13 to define the position of the ball bearings on the sleeve.

In order to prevent the sleeve 11 from turning upon the shaft 5 or moving longitudinally on said shaft, I provide a set collar 14 adapted to encircle the shaft and be secured thereto in any suitable way, as, for example, by means of two hollow-head set screws 15. The adjacent ends of the sleeve 11 and the collar 14 are connected together by means of a dovetail joint. In the embodiment shown in the drawings, a dovetail lug 16 is provided on the set collar 14, and a notch 17 of proper shape to receive said lug is formed in the end of the sleeve 11.

In order to retain lubricant and exclude dirt, each end of the sleeve 7 is preferably provided with an end cap. The end cap 18 at the inner end of the hub has a packing ring or gasket 19 that encircles and bears upon the shaft 5. The other end cap may have a packing ring that surrounds and engages the inner portion of the set collar 14 as shown in Fig. 1, the end cap being indicated at 20, and the numeral 21 denoting the packing ring; or the end cap may enclose the set collar, as represented in Fig. 4, 22 being the end cap and 23 the packing ring. The end caps are secured to the ends of the sleeve 7 by means of screws 24 or 24$^a$.

In the present embodiment of the invention, a clutch mechanism indicated generally at 25 is provided to connect the sleeve 7 and the shaft. Said clutch mechanism may be of any preferred construction. The ball bearing mounting herein shown is especially advantageous in connection with the clutch pulley, since only one end of the bearing is readily accessible for the application of securing means. It will be noted that by reason of the use of a dovetail interlock, a single collar suffices to prevent endwise movement of the bearings in either direction.

In assembling at the factory the form shown in Fig. 1, the collar 14 is positioned in axial alinement with the sleeve 11 by inserting the lug 16 into the bore of the sleeve 11 and moving it outwardly into its recess 17. The collar having been thus interlocked with the sleeve, the end cap 20 is secured to the sleeve 7 by means of screws 24.

When installing the clutch, loose pulley or other device provided with a ball bearing having end caps as shown in Fig. 1, the millwright slips the mounting on the shaft to the desired point and secures the whole in place by means of the screws 15.

When installing the mounting shown in Fig. 4, the millwright first removes the end cap 22, alines the collar 14 with the sleeve 11, slips the mounting onto the shaft to the desired point, tightens up the screws 15$^a$ and then replaces the end cap 22.

Although I have shown a clutch with extended sleeve as the exemplary embodiment of my invention, it is to be understood that I do not limit myself thereto, but aim to cover all embodiments of the invention as expressed in the appended claim.

In the following claim the term "hub" has been used to denote the sleeve 7, the hub of a clutch pulley or other rotatable member, or the analogous part of a hanger box.

I claim as my invention:

A ball bearing mounting comprising, in combination, a pulley or the like to be mounted rotatably upon a shaft, a hub for the pulley, a sleeve within said hub having its end portions reduced in diameter, inner ball races mounted on said ends, outer ball races secured within the hub in proper relation to the inner races, a single collar adapted to be mounted on the shaft adjacent one end of the sleeve, a dovetail lug on the collar extending into a dovetail recess in the end of the sleeve, and means to secure said collar to the shaft.

In testimony whereof, I have hereunto affixed my signature.

ALBERT MASTER.